(12) United States Patent
Yan et al.

(10) Patent No.: US 12,027,984 B2
(45) Date of Patent: Jul. 2, 2024

(54) SWITCHING POWER SUPPLY CONVERTER

(71) Applicant: MSJ SYSTEMS LLC, Milpitas, CA (US)

(72) Inventors: Liang Yan, Milpitas, CA (US); Peng Li, Milpitas, CA (US)

(73) Assignee: MSJ SYSTEMS LLC, Milpitas, CA (US)

( * ) Notice: Subject to any disclaimer, the term of this patent is extended or adjusted under 35 U.S.C. 154(b) by 180 days.

(21) Appl. No.: 17/854,024

(22) Filed: Jun. 30, 2022

(65) Prior Publication Data
US 2022/0329163 A1  Oct. 13, 2022

Related U.S. Application Data

(63) Continuation-in-part of application No. PCT/CN2020/073712, filed on Jan. 22, 2020.

(51) Int. Cl.
H02M 3/335 (2006.01)
H02M 1/00 (2006.01)

(52) U.S. Cl.
CPC ..... H02M 3/33507 (2013.01); H02M 1/0041 (2021.05)

(58) Field of Classification Search
CPC ........... H02M 3/33507; H02M 1/0041; H02M 1/0006; H02M 1/0038; H02M 3/33523
See application file for complete search history.

(56) References Cited

U.S. PATENT DOCUMENTS

| 6,956,750 | B1 | 10/2005 | Eason et al. |
| 7,463,497 | B2 | 12/2008 | Negrete |
| 2011/0261596 | A1* | 10/2011 | Zong ................. H02M 3/33507 363/21.13 |
| 2019/0052174 | A1* | 2/2019 | Gong ................. H02M 3/33507 |

FOREIGN PATENT DOCUMENTS

CN          103023283 A      4/2013

* cited by examiner

Primary Examiner — Jue Zhang
Assistant Examiner — Afework S Demisse

(57) ABSTRACT

The invention relates to a switching power supply converter, which comprising a transformer including a primary winding and a secondary winding, a power switch circuit and a voltage input circuit, a voltage output circuit, an auxiliary winding, a control circuit, and a voltage sensing circuit; the control circuit performs that in a first turn-off period of the power switch circuit, acquiring a first time duration from a preset delay after the power switch circuit turning off until the sensed voltage corresponding to a preset condition, and acquiring a difference between the first time duration and a preset time duration as a second time duration; in a second turn-off period of the power switch circuit, acquiring the sensed voltage at the time point corresponding to the end of the second time duration starting from the preset delay after the power switch circuit turning off as an effective sample.

8 Claims, 9 Drawing Sheets

SWITCHING POWER SUPPLY CONVERTER

CROSS REFERENCE TO RELATED APPLICATIONS

The present application is a Continuation-In-Part Application of PCT Application No. PCT/CN2020/073712 filed on Jan. 22, 2020, the contents of which are incorporated herein by reference in their entirety.

BACKGROUND OF THE INVENTION

1. Technical Field

The invention relates to the field of switching power supply control methods, in particular to a switching power supply converter.

2. Description of Related Art

The loop control of conventional switching power supplies directly senses the output voltage and generates feedback and compensation signals. When a switching power supply requires electrical isolation between the input and output, such as an off-line converter, the feedback compensation circuit and the controller are typically placed on two sides of the electrical isolation device, that is, one side is the input side (referred to herein as the "primary side") and the output side (referred to herein as the "secondary side"). There is no direct common electrical connection between the primary and secondary sides, and isolation devices such as an optocoupler is used to transmit signals. Isolation devices and their associated circuitry increase the cost and size of the system. Therefore, primary side sensing technique is often used in many low cost applications. When the main switch on the primary side is turned off and the output rectifier is turned on, the output voltage applies to the secondary winding of the transformer. By magnetic coupling e of the transformer, the voltage on the auxiliary winding is proportional to the voltage on the secondary winding through the coupling between the auxiliary winding and the secondary winding. Therefore, the control circuit on the primary side can indirectly detect the output voltage value by sampling the voltage on the auxiliary winding.

FIG. 1 is a schematic diagram of a conventional primary side feedback circuit, where the input voltage is Vin. S1 is the main switch on the primary side. The transformer Tx1 has a primary winding Np, a secondary winding Ns and an auxiliary winding Na. D1 is an output rectifier having an on-state voltage drop "Vf". A control circuit output signal DRV drives S1 on or off. When S1 is on, the transformer stores energy from the input "Vin". When S1 is turned off, the transformer releases energy to the output. And that power supply of the control circuit is provided by the auxiliary winding through a rectifier D2. The control circuit obtains the output voltage information by sampling the signal of the auxiliary winding Na to the FB pin.

FIG. 2 shows an output voltage detection method of the circuit of FIG. 1. As shown in FIG. 2, after the driving signal DRV of the main switch is turned off, the voltage across the auxiliary winding voltage can be expressed as $$V_{FB} = (V_{out} + V_f + I_{sec}R_{sec})\frac{N_a}{N_s}\frac{R_2}{R_1+R_2}$$

Where: $V_{FB}$ is a sensed voltage, Vout is an output voltage, Vf is an on-state voltage drop of output rectifier, Isec is a secondary current of transformer, Rsec is an equivalent resistance of secondary side current path, Na is the number of auxiliary winding turns of transformer, Ns is the number of secondary winding turns of transformer. When the secondary side current decreases to the minimum value, i.e. point A in the figure, where Isec=0, Vf is also close to 0, and the feedback voltage $V_{FB}$ can accurately represent the output voltage Vout. Therefore, many methods have been proposed to sample the output voltage near the point A.

"U.S. Pat. No. 7,463,497 B2" utilizes 2 sample-and-hold circuit channels to alternately sense the $V_{FB}$ voltage. A stop signal is output when an abrupt change of slope at the falling edge of $V_{FB}$ is detected. The last sample and hold value of the $V_{FB}$ voltage before the stop signal is used as the effective voltage sample. This method needs two high-speed sampling and holding circuit channels and the cost is high.

"U.S. Pat. No. 6,956,750 B1" uses two varying voltage levels to track the position of the abrupt change point of the $V_{FB}$ slope, and the effective voltage sample can be obtained through the relative position information of the two voltage levels vs. $V_{FB}$. This method actively searches the position of the sampling point. It requires a complex digital control algorithm and often at high cost.

Besides the above two patents, in order to reduce the complexity, a simplified method is to set the sampling point to a fixed time delay after the main switch is turned off. This method is simple, but under different working conditions, the output currents at the sampling point of the fixed delay can be very different, which results in a relatively large error term $V_f+I_{sec}R_{sec}$ so a large error of the effective voltage sample is expected.

BRIEF SUMMARY OF THE INVENTION

The present invention provides a switching power supply converter auxiliary winding voltage sampling method which can accurately track the sampling position with reduced complexity.

According to the technical scheme, the switching power supply converter comprises a transformer including a primary winding and a secondary winding, a power switch circuit and a voltage input circuit connected to the primary winding, a voltage output circuit connected to the secondary winding, an auxiliary winding coupled to the secondary winding, a control circuit connected to the power switch circuit, a voltage sensing circuit connected to the auxiliary winding and the control circuit is used for acquiring a sensed voltage;

the control circuit executes the following steps:

in a first turn-off period of the power switch circuit, acquiring a first time duration from a preset delay after the power switch circuit turning off until the sensed voltage satisfies a present condition;

obtaining a difference between the first time duration and a preset time duration as a second time duration;

in a second turn-off period of the power switch circuit, acquiring the sensed voltage at the time point to the end of the second time duration from a preset delay after the power switch circuit turning off as an effective voltage sample.

Preferably, the preset delay is zero.

Preferably, the present condition comprises that the sensed voltage is lower than or equal to a present voltage.

The invention also discloses a switching power supply converter comprising a transformer including a primary winding and a secondary winding, a power switch circuit and a voltage input circuit connected to the primary winding, a voltage output circuit connected to the secondary winding, an auxiliary winding coupled with the secondary winding, a control circuit connected to the power switch circuit, and a voltage sensing circuit connected to the auxiliary winding and the control circuit and used for acquiring a sensed voltage;

the control circuit includes:

a first driving unit connected to the voltage sensing circuit to generate a first driving signal when the sensed voltage satisfies a present condition;

a timing unit which is used for acquiring the time duration from the power switch circuit being turned off and to generating a corresponding timing signal;

a reference unit connecting the first driving unit and the timing unit for receiving the first driving signal to generate a reference signal corresponding to a current timing duration;

a second driving unit connecting the timing unit and the reference unit to generate a second driving signal based on the timing signal and the reference signal;

and a sample-and-hold unit connected to the second driving unit and the voltage sensing circuit and used for receiving the second driving signal to conduct sample and hold to acquire the sensed voltage and output an effective voltage sample.

Preferably, the timing unit comprises a current source, a first charging unit and a reset unit;

a first end of the first charging unit is respectively connected to the current source and the second driving unit, and a second end of the first charging unit is grounded;

a first end of the reset unit is connected to a first end of the first charging unit, a second end of the reset unit is connected to a second end of the first charging unit, and a third end is configured to receive a reset signal to discharge the first charge unit.

Preferably, the reference unit comprises a switch, a second charging unit and a bias unit;

a control end of the switch is connected to the first driving unit, a first end of the switch is connected to the current source and a first end of the first charging unit, a second end of the switch is respectively connected to a first end of the second charging unit and a first end of the bias unit, a second end of the bias unit is connected to the second driving unit.

Preferably, the second charging unit includes a charging capacitor C1.

Preferably, the timing unit comprises a clock source and a counter;

a first end of the counter is connected to the clock source, a second end of the counter is connected to the second driving unit, and a third end of the counter receives a reset signal.

Preferably, the reference unit comprises a register and a subtractor;

a first end of the register is connected to the counter, a second end of the register is connected to the first driving unit, a third end of the register is connected to a first input of the subtractor, a second input of the subtractor connected to an offset constant, and an output of the subtractor connected to the second driving unit.

Preferably, the first drive circuit includes a first comparator and a first detection circuit;

a non-inverting input of the first comparator is connected to the voltage sensing circuit, an inverting input of the first comparator is input with a reference voltage, an output of the first comparator is connected to the first detection circuit, and the first detection circuit outputs the first driving signal.

Preferably, the reference voltage is lower than or equal to 0.1V.

Preferably, the second driving unit includes a second comparator and a second detection circuit;

a non-inverting input of the second comparator is connected to the timing unit, a inverting input of the second comparator is connected to the reference unit, an output of the second comparator is connected to the second detection circuit, and the second detection circuit outputs the second driving signal.

The switching power supply converter provided by the invention has the advantage of actively tracking the accurate voltage sampling point to allow obtaining the effective voltage sample with reduced complexity.

BRIEF DESCRIPTION OF THE SEVERAL VIEWS OF THE DRAWINGS

The present invention will be further described with reference to the accompanying drawings and embodiments, in which.

DETAILED DESCRIPTION OF THE INVENTION

For a clearer understanding of the technical features, objects, and effects of the present invention, specific embodiments of the present invention will now be described in detail with reference to the accompanying drawings.

Figure 1:
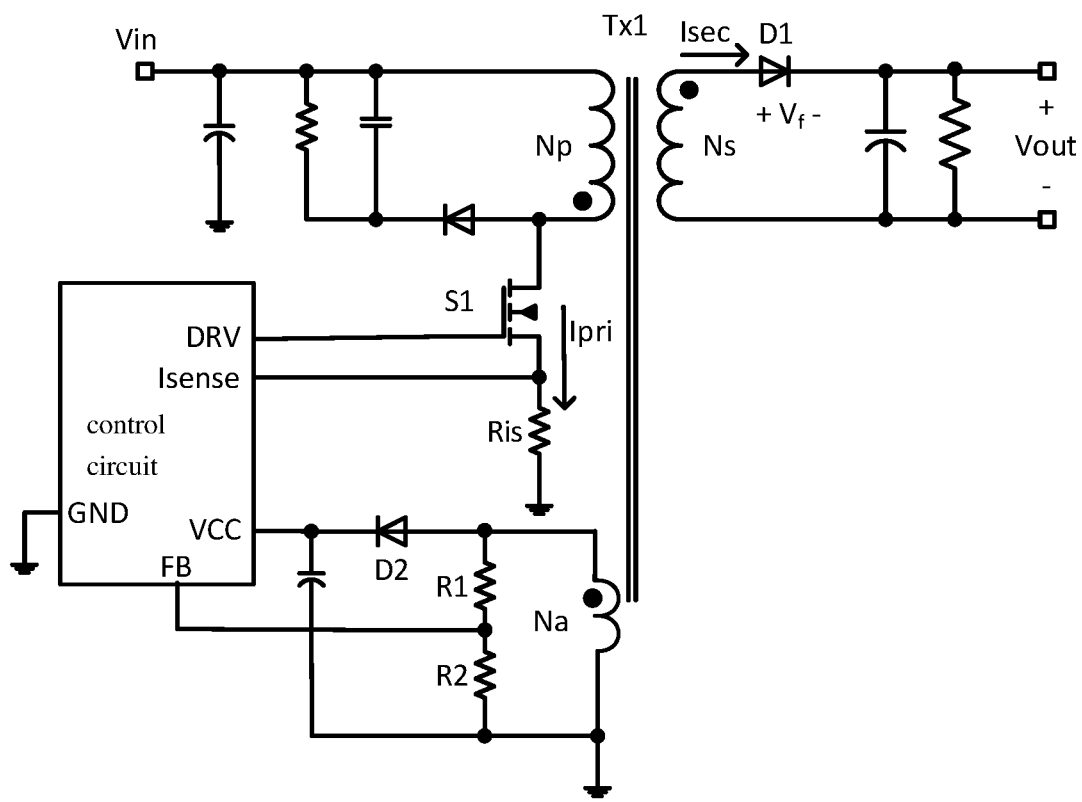
FIG. 1 is a schematic circuit diagram of a conventional flyback converter.
Figure 2:
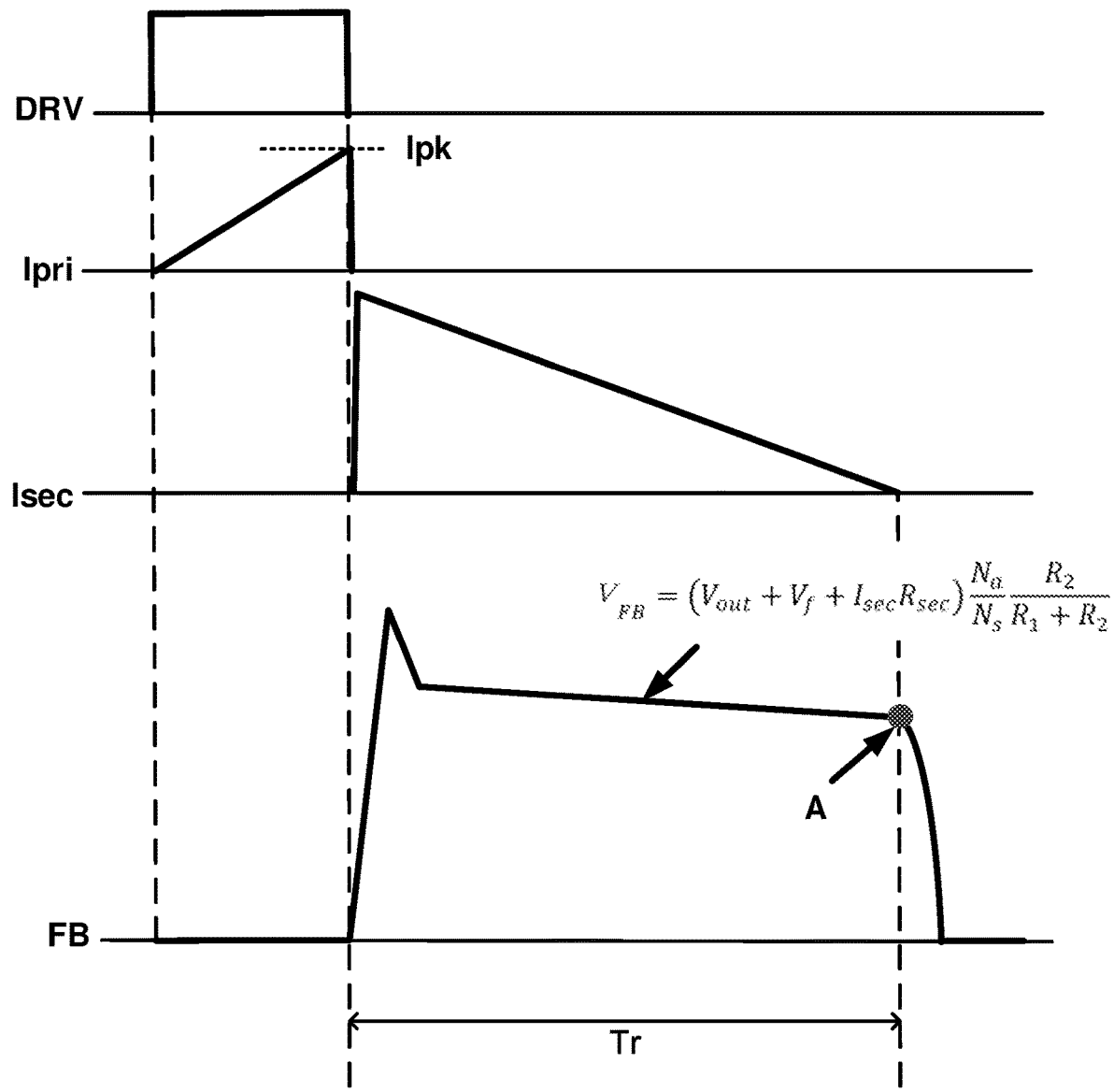
FIG. 2 is an illustration of feedback sample in a flyback converter base on FIG. 1.
Figure 3:
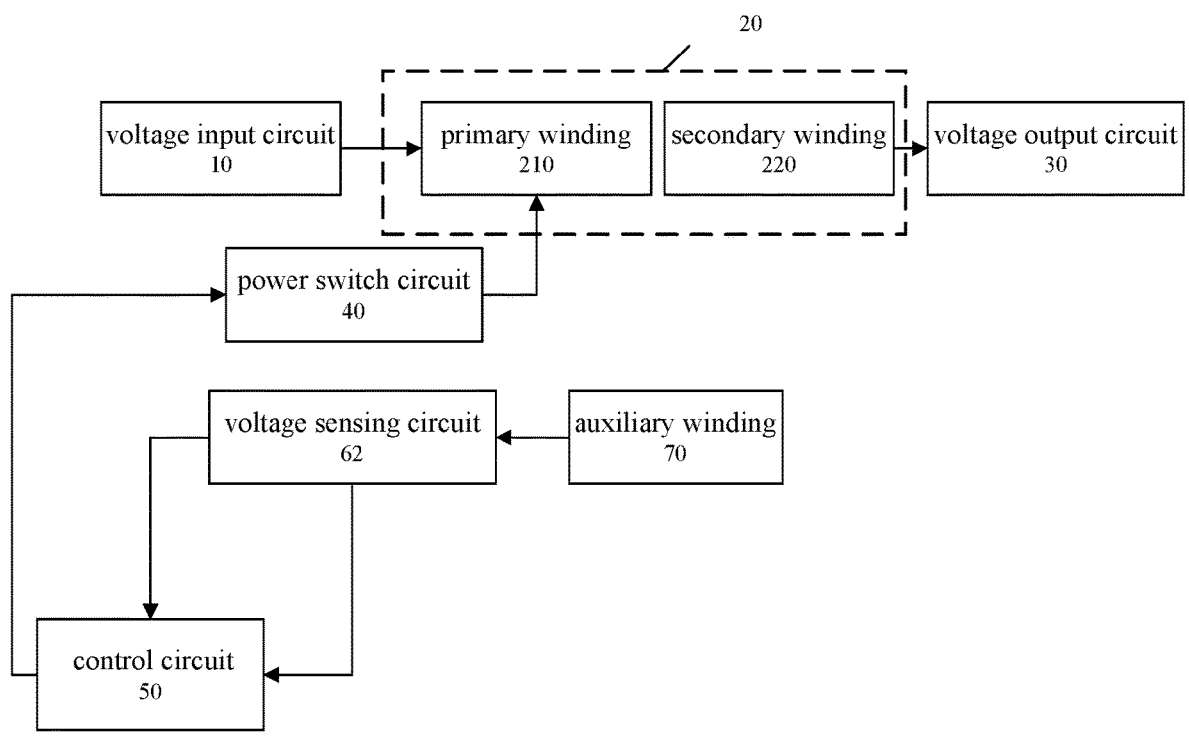
FIG. 3 is a block diagram of a switching power supply converter according to an embodiment of the present invention.

As shown in FIG. 3, in a first embodiment of a switching power supply converter of the present invention, the switching power supply converter comprises a transformer 20 including a primary winding 210 and a secondary winding 220, a power switch circuit 40 and a voltage input circuit 10 connected to the primary winding 210, a voltage output circuit 30 connected to the secondary winding 220, an auxiliary winding 70 coupled to the secondary winding 220; a control circuit 50 connected to the power switch circuit 40, a voltage sensing circuit 62 connected to the auxiliary winding 70 and the control circuit 50 is senses the auxiliary winding voltage. The control circuit 50 executes the following steps: in the first turn-off period of the power switch circuit 40, acquiring a first time duration from a preset delay after the power switch circuit 40 turning off until the sensed voltage satisfies a preset condition; acquiring a difference between the first time duration and a preset time duration as a second time duration; during a second turn-off period of the power switch circuit 40, acquiring the sensed voltage at the time point corresponding to the end of the second time duration which starts from the preset delay after the power switch circuit turning off as the effective voltage sample. Specifically, during the turn-off period of the power switch circuit 40, the sensed voltage obtained by the voltage sensing circuit 62 connected to the auxiliary winding 70 varies proportionally to the output voltage across the secondary winding 220. When the sensed voltage of auxiliary winding meets a preset condition, for example, decreases to a point approximately equal to zero, or zero-crossing point, the first time duration can be obtained from the time after a preset delay after the power switch circuit 40 being turned off to the zero-crossing point. Here, the preset delay may be approximately equal to zero, that is, the timing is started when the power switch circuit is turned off. A reasonable preset time duration may be set according to the circuit characteristics, and the time corresponding to the zero-crossing point is subtracted by a preset time duration to obtain a new time duration, i.e., a second time duration, which is counted from the time when the power switch circuit 40 is turned off within the turn-off period of the power switch circuit 40. In the next turn-off period of the power switch circuit 40, the sensed voltage at the time point corresponding to the end of the second time duration which starts from the power switch circuit 40 is turned off may be obtained as the effective voltage sample. The control circuit 50 then performs control of the circuit in accordance with the effective voltage sample.

Further, the preset condition can be understood as the sensed voltage is lower than or equal to a preset voltage, and it can be understood that the preset voltage can be as low as possible, and it can be lower than or equal to 0.1V based on to the accuracy of the circuit.

Figure 4:
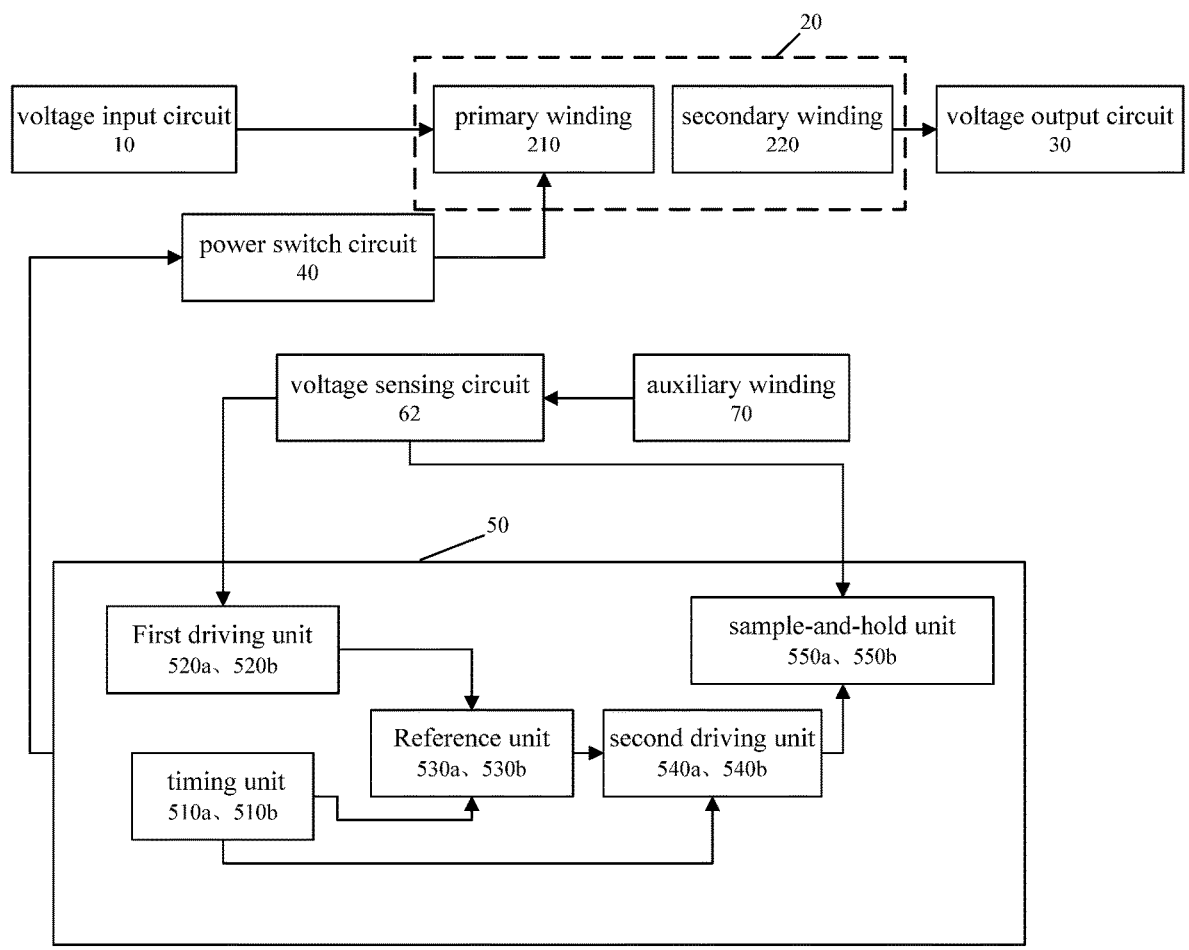
FIG. 4 is a block diagram of another embodiment of a switching power supply converter according to the present invention.

As shown in FIG. 4, based on the above operating principle of the control circuit, an implementation circuit can be realized. In a first embodiment of a switching power supply converter of the present invention, a transformer 20 includes a primary winding 210 and a secondary winding 220, a power switch circuit 40 and a voltage input circuit 10 connected to the primary winding 210, a voltage output circuit 30 connected to the secondary winding 220, an auxiliary winding 70 coupled to the secondary winding 220, a control circuit 50 connected to the power switch circuit 40, a voltage sensing circuit 62 connected to the auxiliary winding 70, the control circuit 50 includes a first driving unit 520*a* or 520*b* connected to the voltage sensing circuit 62 to generate a first driving signal according to a sensed voltage of the voltage sampling unit 62; a timing unit 510*a* or 510*b* for acquiring the time duration from the power switch circuit 40 being turned off and generating a corresponding timing signal; a reference unit 530*a* or 530*b* connected to the first driving unit 520*a* or 520*b* and the timing unit 510*a* or 510*b* for receiving the first driving signal to generate a reference signal corresponding to a current timing duration; a second driving unit 540*a* or 540*b* connected to the timing unit 510*a* or 510*b* and the reference unit 530*a* or 530*b* to generate a second driving signal based on the timing signal and the reference signal; and a sample-and-hold unit 550*a* or 550*b* connected to the second driving unit 540*a* or 540*b* and the voltage sensing circuit 62, and is used to receive the second driving signal to conduct sample and hold to acquire the sensed voltage to output the effective voltage sample.

Specifically, the control circuit 50 monitors the sensed voltage of the voltage sensing circuit 62 and generate the first driving signal through the first driving circuit 520*a* or 520*b* when the sensed voltage satisfies a preset condition, for example, is approximately at a zero-crossing point. It can also be understood that the timing unit 510*a* or 510*b* record the time of the turn-off period of the power switch circuit 40, and the reference unit 530*a* or 530*b* generates the reference signal according to the time point when the turn-off period ends. It can also be understood that the reference signal is generated corresponding to the reference time point. Meanwhile, in the next turn-off period of the power switch circuit 40, the timing unit 510*a* or 510*b* record the time duration of the turn-off period of the power switch circuit 40, and when the time duration reaches the reference time point, obtain the sensed voltage of the voltage sensing circuit 62 and generate the effective voltage sample. The reference signal corresponding to the reference time point is generated by the reference unit 530*a* or 530*b*, that is, it is understood that the time point corresponding to the zero-crossing point is obtained and a reference time point is set according to the zero-crossing time point in a turn-off period of the power switch circuit 40, that is, a suitable reference time point before the zero-crossing time point is found and recorded. During the next turn-off period of the power switch circuit 40, before the first driving circuit 520*a* or 520*b* start to work, that is, before the first driving circuit 520*a* or 520*b* reach the zero-crossing point, the timing unit 510*a* or 510*b* record the turn-off time of the power switch circuit 40, and when the turn-off time of the power switch circuit 40 reaches the reference time point, the second driving unit 540*a* or 540*b* are used to obtain the effective voltage sample.

Figure 5:
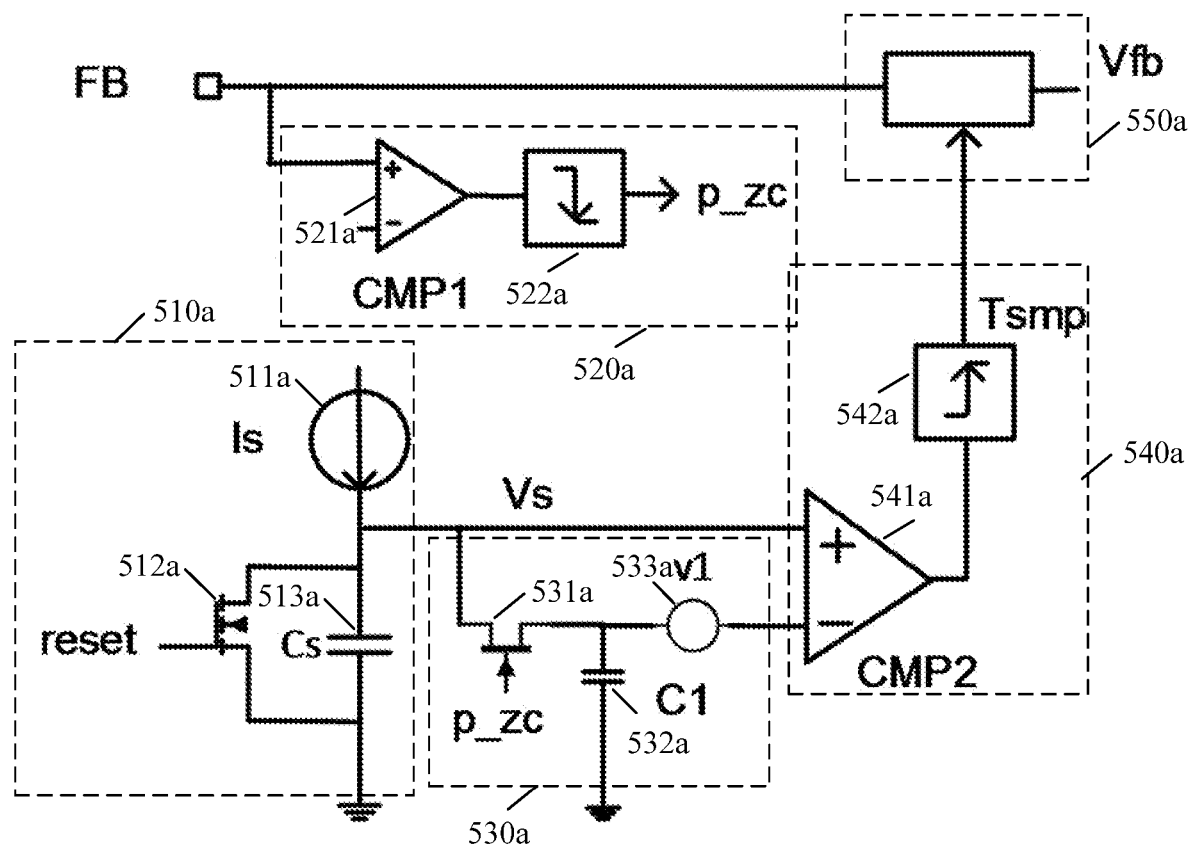
FIG. 5 is a circuit schematic of an embodiment of the control circuit of FIG. 4.

As shown in FIG. 5, in one embodiment, the timing unit 510*a* includes a current source 511*a*, a first charging unit 513*a*, and a reset unit 512*a*;

a first end of the first charging unit 513*a* is respectively connected to the current source 511*a* and the second driving unit 540*a*, a second end of the first charging unit 513*a* is grounded;

a first end of the reset unit 512*a* is connected to a first end of the first charging unit 513*a*, a second end of the reset unit 512*a* is connected to a second end of the first charging unit 513*a*, and a third end thereof is configured to receive a reset signal to discharge the first charging unit 513*a*.

Specifically, the current source 511*a* in the control circuit 50 starts to operate, and charges the first charging unit 513*a*. During the charging process of the first charging unit 513*a*, the charging voltage increases, and the charging voltage is input to the second driving unit 540*a* as the output voltage of the timing unit 510*a*. The second driving unit 540*a* compares the charging voltage with the reference signal output from the reference unit 530*a*, and generating a second driving signal when the relationship between the two satisfies a preset condition, that is, the time point corresponds to the target sampling point. At the end of turn-off period, the reset unit 512*a* receives the reset signal to discharge the first charging unit 513*a*, so that the first charging unit 513*a* returns to the initial state to perform the same operation in the next turn-off period.

Furthermore, the reference unit 530*a* includes a switch 531*a*, a second charging unit 532*a*, and a bias unit 533*a*; a control end of the switch 531*a* is connected to the first driving unit 520*a*, a first end of the switch 531*a* is connected to the current source 511*a* and a first end of the first charging unit 513*a*, and a second end of a switch 531*a* is respectively connected to a first end of the second charging unit 532*a* and a first end of the bias unit 533*a*. a second end of the second charging unit 532*a* is grounded, and a second end of the bias unit 533*a* is connected to the second driving unit 540*a*. Specifically, the first driving signal generated by the first driving unit 520*a* when the sensed voltage is approximately a zero-crossing point drives the switch 531*a* to be turned on.

And then, the charging voltage of the first charging unit 513*a* in the timing unit 510*a* reaches a specific voltage value, which corresponds to the time of a turn-off period. After the switch 531*a* is turned on, the specific voltage value charges the second charging unit 532*a*, and the specific voltage value is recorded by the second charging unit 532*a*, that is, the time of a turn-off period is recorded by the second charge unit 532*a*. The bias unit 533*a* generates a reference voltage Vn that offsets the specific voltage value. In the next turn-off period of the power switch circuit 40, before the switch 531*a* is turned on, when the voltage output by the timing unit 510*a* reaches the reference voltage, the second driving unit 540*a* can drive the sample-and-hold unit to obtain an effective voltage sample. That is, it is equivalent to setting a reasonable reference voltage during the charging process of the first charging unit 513*a* in the turn-off period of the power switch circuit 40, so that before the turn-off period, when the charging voltage of the first charging unit 513*a* corresponding to the specific voltage value, the sensed voltage of the voltage sensing circuit 62 will become the effective voltage sample.

Optionally, the second charging unit 532*a* may be a charging capacitor C1. The switching transistor 531*a* may be a MOS transistor, a triode, or other controllable switching devices.

Figure 6:
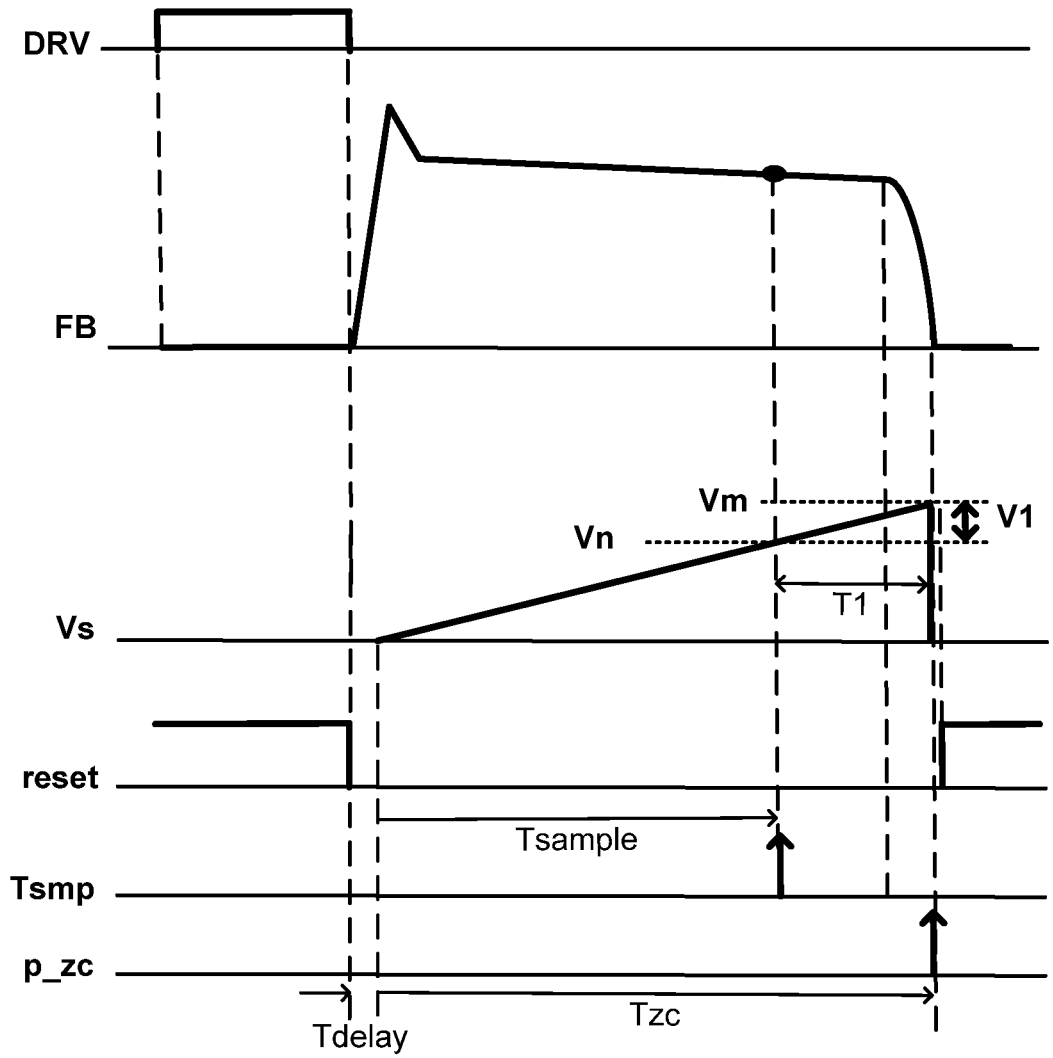
FIG. 6 is an illustration of an embodiment of that operation of FIG. 5.
Figure 7:
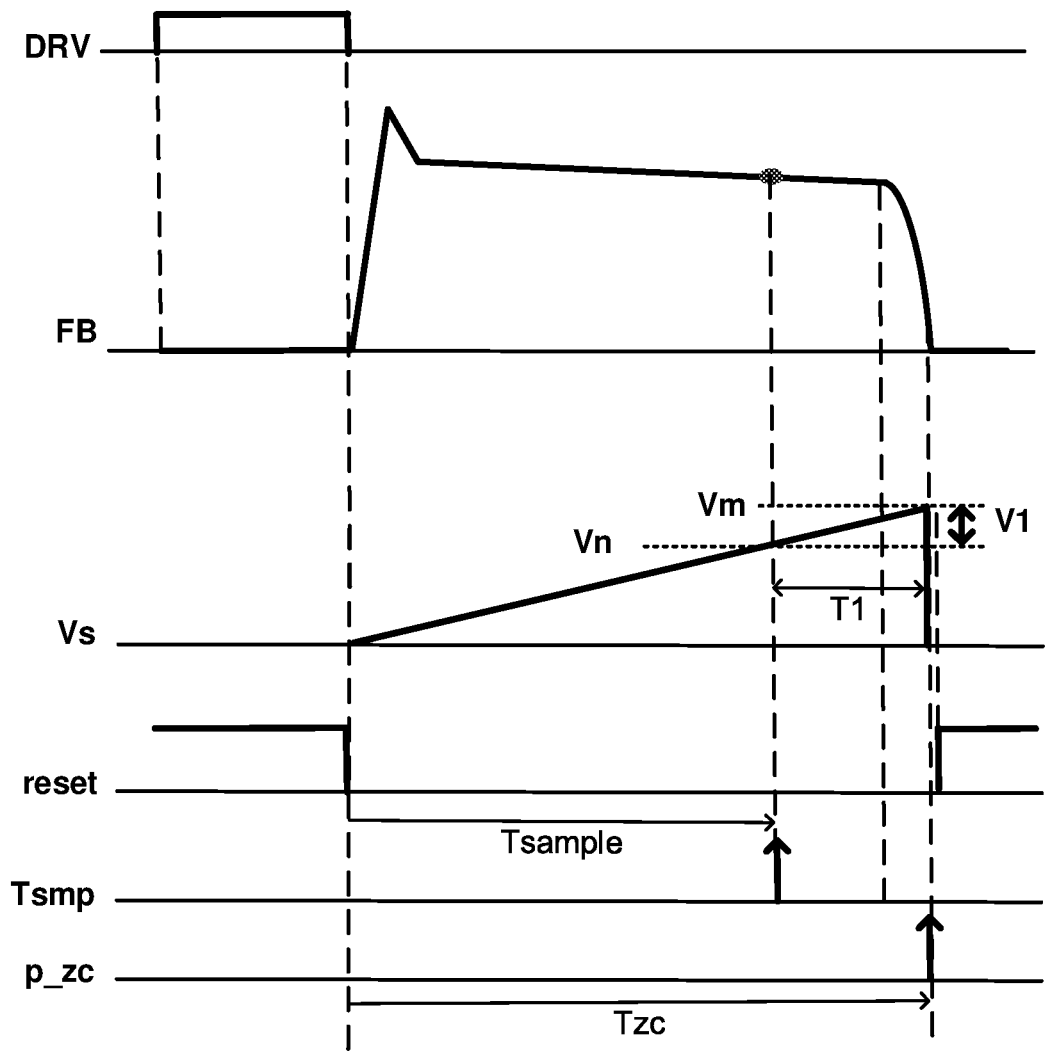
FIG. 7 is an illustration of another embodiment of that operation of FIG. 5.

FIG. 6 and FIG. 7 are the illustration of the process of FIG. 5. In the embodiment as show in the FIG. 7, the preset delay "Tdelay" is zero, the feedback sampling signal "FB" detects the zero crossing of the signal "FB" by the comparator CMP1 and generates a zero-crossing time pulse "p_zc". After the power switch circuit 50 is turned off, the current source is released under the control of the reset signal, and the current source "Is" begins to charge the charging capacitor Cs. When the pulse "p_zc" arrives, the voltage on the charging capacitor Cs reaches a specific voltage "Vm", which is sampled to the charging capacitor C1 for use in the next turn-off period of the power switch circuit 50. The specific voltage "Vm" minus a voltage offset "V1" is equal to the reference voltage "Vn". When the charging voltage of the charging capacitor Cs reaches a value equal to the reference voltage "Vn" in the next switching period, a sampling pulse "Tsmp" is generated, and the sampling pulse triggers the sampling feedback input "FB" to obtain the output feedback detection "Vfb". In this embodiment, the bias voltage "V1" and the parameters of the charging capacitor Cs and the current source Is can be designed as required, so that a fixed time "T1" when the feedback sampling signal "FB" is at zero-crossing point can be obtained. So as to maintain the secondary side current at the sampling point unchanged. Thereby greatly reducing the uncertainty of the error caused by the secondary side current to the sampling.

Figure 8:
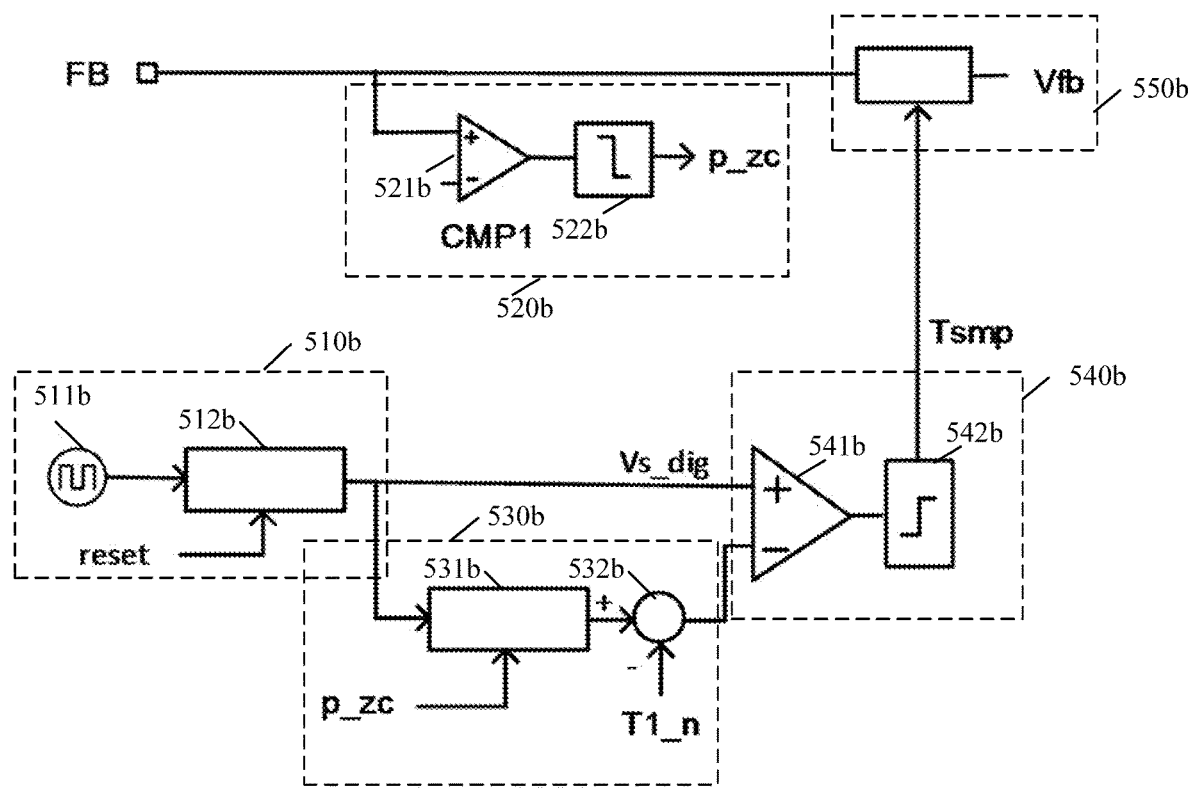
FIG. 8 is a circuit diagram of another embodiment of the control circuit of FIG. 4.

As shown in FIG. 8, in an embodiment, the timing unit 510*b* includes a clock source 511*b* and a counter 512*b*, wherein a first end of the counter 512*b* is connected to the clock source 511*b*, a second end of the counter 512*b* is connected to the second driving unit 540*b*, and a third end of the second driving unit 540*b* is to receive a reset signal. Specifically, the clock source 511*b* may time the turn-off duration of the power switch circuit 40 to obtain and record one turn-off period of the power switch circuit 40.

Further, the reference unit 530*b* includes a register 531*b* and a subtractor 532*b*; a first end of the register 531*b* is connected to the counter 512*b*, a second end of the register 531*b* is connected to the first driving unit 520*b*, a third end of the register 531*b* is connected to a first input of the subtractor 532*b*, a second input of the subtractor 532*b* connected to an offset constant. The output of the subtractor 532*b* is connected to the second driving unit 540*b*. Specifically, when acquiring a turn-off period of the power switch circuit 40, the register 531*b* may store the turn-off period of the power switch circuit 40, and the subtractor 532*b* may perform offset based on the turn-off period to obtain a specific time point before the end of the turn off period. When the timing of the timing unit reaches the specific time point, acquiring a sensed voltage of the voltage sensing circuit 62 as the effective voltage sample.

Figure 9:
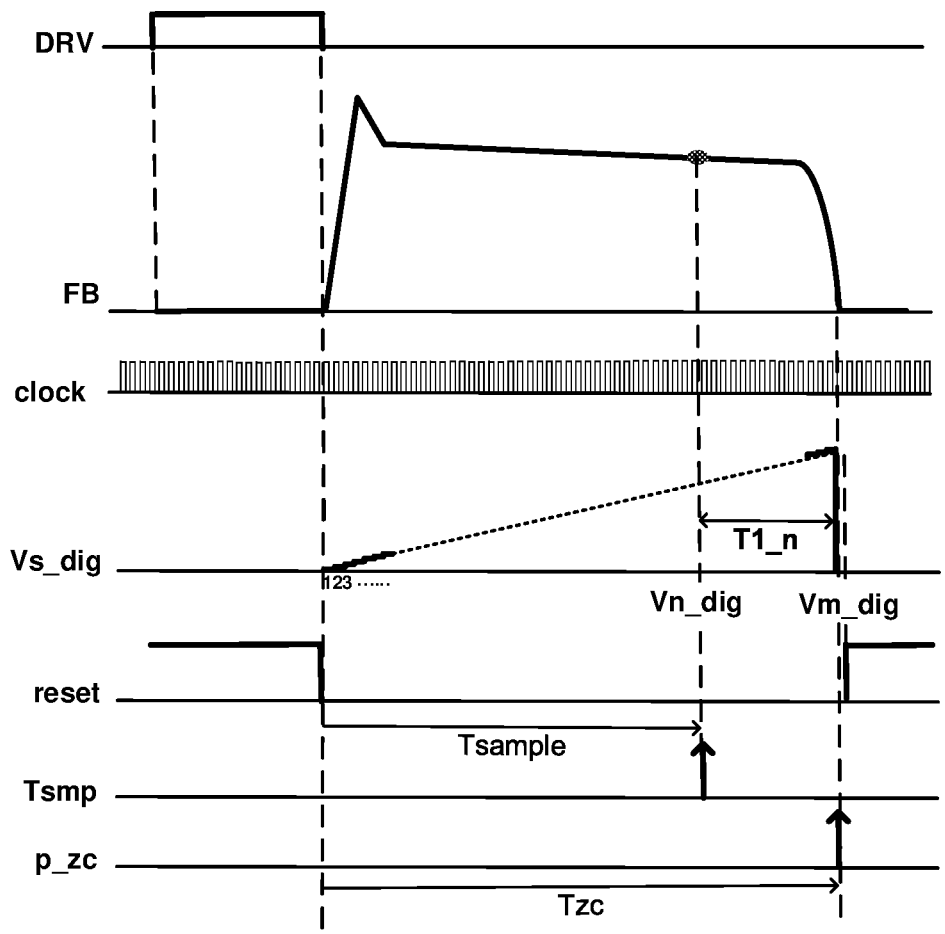
FIG. 9 is an illustration of that operation of FIG. 7.

FIG. 9 is an illustration corresponding to FIG. 7. In this embodiment, the counter 512*b* returns to zero and stops counting when receiving the reset signal "reset". When the reset signal "reset" is released, it starts to count the clock. The register 531*b* holds the value of the output "Vs_dig" of the counter 512*b* when the pulse "p_zc" comes. T1_*n* is a constant value set by the subtractor, which corresponds to the fixed time expected to be pushed forward from the point "Tzc" in this embodiment, wherein the time corresponding to the point "Tzc" is the time point of the zero-crossing point. When the pulse "p_zc" comes, the output value "Vs_dig" of the counter 512*b* is equal to "Vm_dig". This value is stored in register 531*b*. The Vm_dig minus the T1_*n* is equal to Vn_dig and the Vn_dig as the reference value in the next period. In the next period, when the output value "Vs_dig" of the counter reaches Vn_dig, a sampling pulse is generated at the corresponding time point "Tsample". And then acquiring a corresponding sensed voltage as an effective voltage sample according to the pulse.

In an embodiment, the first driving circuit 520*a* or 520*b* include a first comparator 521*a* or 521*b* and a first detecting circuit 522*a* or 522*b*, a non-inverting input of the first comparator 521*a* or 521*b* is connected to the voltage sensing circuit 62, an inverting input of the first comparator 521*a* or 521*b* is connected to a reference voltage, an output of the first comparators 521*a* or 521*b* is connected to the first detection circuit 522*a* or 522*b*, and the first detection circuit 522*a* or 522*b* are configured to output a first driving signal. Specifically, the first comparator 521*a* or 521*b* compare the sensed voltage with the reference voltage during the change of the sensed voltage, so as to output a comparison result when the sensed voltage satisfies the reference voltage. The setting of the reference voltage can be approximated to the zero-crossing point of the sensed voltage, that is, the reference voltage can be as low as possible. The comparison result may be a level change, and the first detection circuit 522*a* or 522*b* generates a first driving signal when detecting the level change, so as to drive the following circuits to perform corresponding operations.

Further, the reference voltage setting is generally as low as possible, and may be set to less than or equal to 0.1 V, depending on the accuracy that the circuit can achieve.

In one embodiment, the second driving unit 540*a* or 540*b* include second comparator 541*a* or 541*b* and second detection circuit 542*a* or 542*b*; a non-inverting input of the second comparator 541*a* or 541*b* is connected to the timing unit 510*a* or 510*b*, and an inverting input of the second comparator 541*a* or 541*b* is connected to the reference unit 530*a* or 530*b*. an output of the second comparator 541*a* or 541*b* is connected to the second detection circuit 542*a* or 542*b*, and the second detection circuit 542*a* or 542*b* is configured to output a second driving signal. Specifically, the second comparator 541*a* or 541*b* compare the current counter with the preset timing parameter during the counting process of the timing unit 510*a* or 510*b*, and output the comparison result when the counter value reaches the preset timing parameter. The comparison result may be a level change, and the second detection circuit 542*a* or 542*b* generates a second driving signal when detecting the level change, so as to drive the following circuits to perform corresponding operations.

It should be understood that the above embodiments only represent the preferred embodiments of the present invention, and the description is more specific and detailed, but it should not be understood as a limitation to the patent scope of the present invention; It should be noted that, for those of ordinary skill in the art, the above technical features can be freely combined, and several modifications and improvements can be made without departing from the concept of the present invention, which all fall within the scope of protection of the present invention; therefore, Equivalents and modifications, which are within the scope of the claims, are intended to be within the scope of the claims.

What is claimed is:

1. A switching power supply converter, comprising: a transformer including a primary winding and a secondary winding, a power switch circuit and a voltage input circuit connected to the primary winding, a voltage output circuit connected to the secondary winding, an auxiliary winding coupled to the secondary winding , a control circuit connected to the power switching circuit, and a voltage sensing circuit connected to the auxiliary winding and the control circuit and used for acquiring a sensed voltage;

the control circuit includes:
a first driving unit connected to the voltage sensing circuit to generate a first driving signal when the sensed voltage satisfies a preset condition;
a timing unit which is used for acquiring the time duration of the power switch circuit being turned off and generating a corresponding timing signal;
a reference unit connecting the first driving unit and the timing unit for receiving the first driving signal to generate a reference signal corresponding to a current timing duration;
a second driving unit connecting the timing unit and the reference unit to generate a second driving signal based on the timing signal and the reference signal;
and a sample-and-hold unit which is connected to the second driving unit and the voltage sensing circuit and is used for receiving the second driving signal to conduct sample and hold to acquire the sensed voltage and output an effective voltage sample.

2. The switching power supply converter according to claim 1, wherein the timing unit comprises a current source, a first charging unit and a reset unit;
a first end of the first charging unit is respectively connected to the current source and the second driving unit, and a second end of the first charging unit is grounded;
a first end of the reset unit is connected to a first end of the first charging unit, a second end of the reset unit is connected to a second end of the first charging unit, and a third end is configured to receive a reset signal to discharge the first charge unit.

3. The switching power supply converter according to claim 2, wherein the reference unit comprises a switch, a second charging unit and a bias unit;
a control end of the switch is connected to the first driving unit, a first end of the switch is connected to the current source and a first end of the first charging unit, a second end of the switch is respectively connected to a first end of a second charging unit and a first end of the bias unit, and a second end of the second charging unit is grounded; a second end of the bias unit is connected to the second driving unit.

4. The switching power supply converter according to claim 1, wherein
the timing unit comprises a clock source and a counter;
a first end of the counter is connected to the clock source, a second end of the counter is connected to the second driving unit, and a third end of the counter receives a reset signal.

5. The switching power supply converter according to claim 4, wherein the reference unit comprises a register and a subtractor;
a first end of the register is connected to the counter, a second end of the register is connected to the first driving unit, a third end of the register is connected to a first input of the subtractor, a second input of the subtractor connected to an offset constant, and the output of the subtractor is connected to the second driving unit.

6. The switching power supply converter according to claim 1, wherein the first driving circuit comprises a first comparator and a first detection circuit;
a non-inverting input of the first comparator is connected to the voltage sensing circuit, an inverting input of the first comparator is input with a reference voltage, an output of the first comparator is connected to the first detection circuit, and the first detection circuit outputs the first driving signal.

7. The switching power supply converter according to claim 6, wherein the reference voltage is lower than or equal to 0.1 V.

8. The switching power supply converter according to claim 1, wherein the second driving unit comprises a second comparator and a second detection circuit;
a non-inverting input of the second comparator is connected to the timing unit, an inverting input of the second comparator is connected to the reference unit, an output of the second comparator is connected to the second detection circuit, and the second detection circuit outputs the second driving signal.

* * * * *